(No Model.)  3 Sheets—Sheet 1.
M. F. WILLIAMS.
BREAKING MACHINE.
No. 604,485. Patented May 24, 1898.
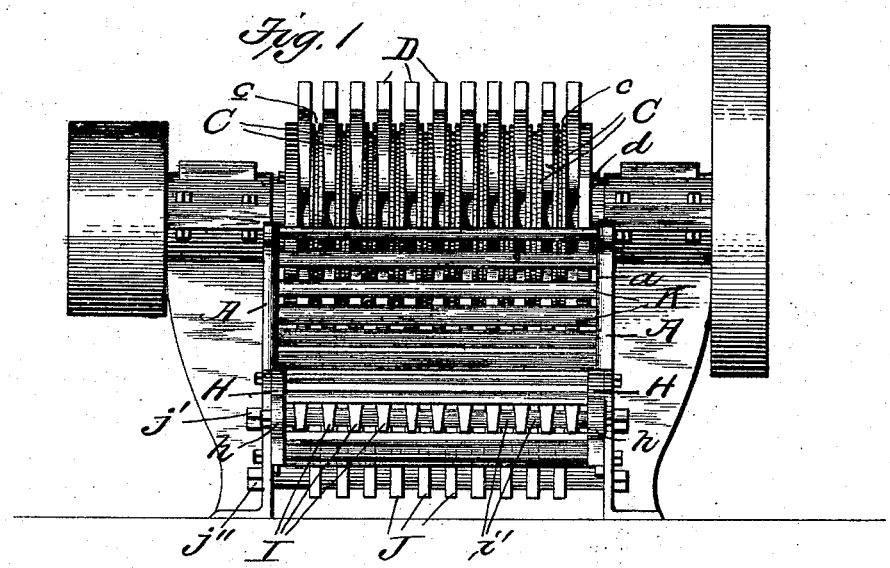
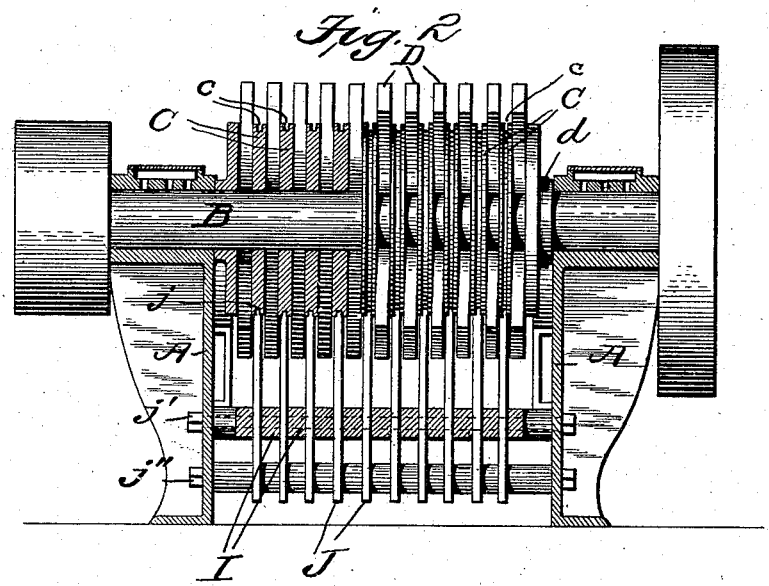
Witnesses
G. A. Pennington
Hugh K. Wagner
Inventor
M. F. Williams
By
Bakewell &
Cornwall
his attys (No Model.) 3 Sheets—Sheet 2.

M. F. WILLIAMS.
BREAKING MACHINE.

No. 604,485. Patented May 24, 1898.

Witnesses:

Inventor:
M. F. Williams
by Bakewell & Cornwall
Atty's (No Model.) 3 Sheets—Sheet 3.
M. F. WILLIAMS.
BREAKING MACHINE.
No. 604,485. Patented May 24, 1898.
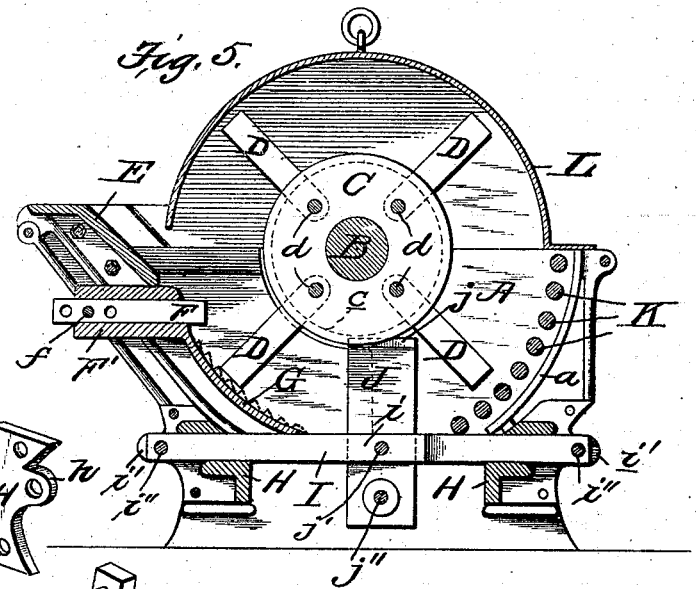
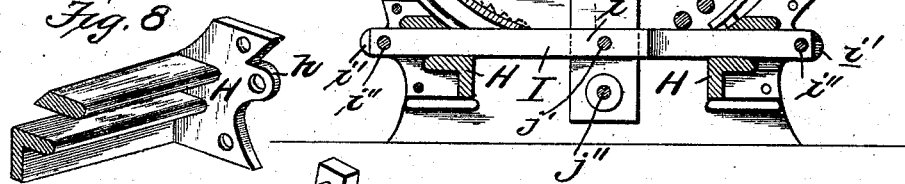
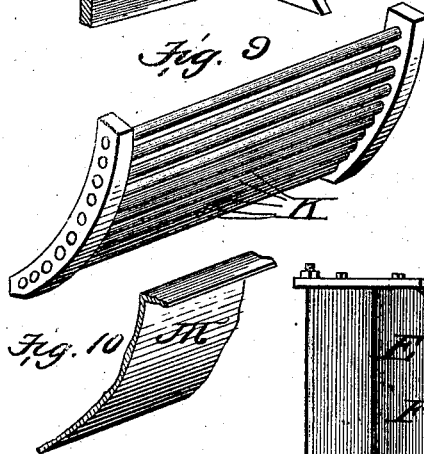
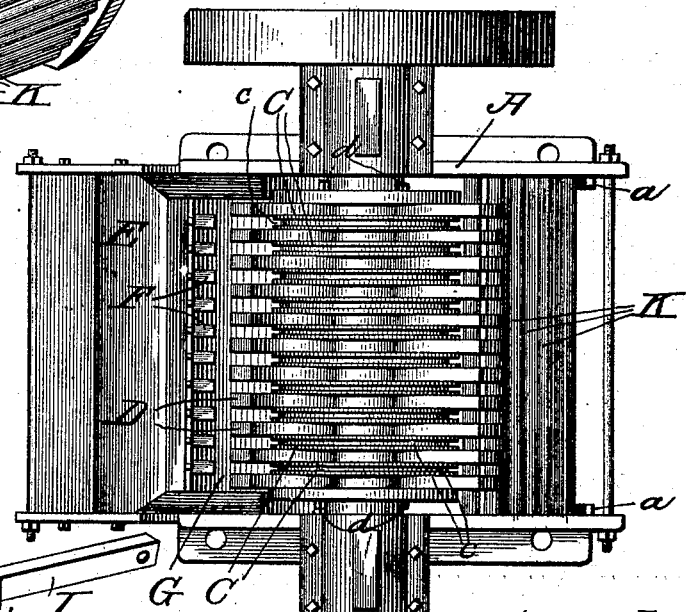
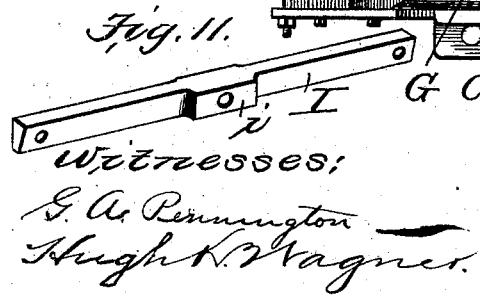
Witnesses:
G. A. Pennington
Hugh K. Wagner
Inventor
M. F. Williams
by
Bakewell & Cornwall
his attys.
THE NORRIS PETERS CO., WASHINGTON, D. C.

UNITED STATES PATENT OFFICE.

MILTON F. WILLIAMS, OF ST. LOUIS, MISSOURI, ASSIGNOR TO THE WILLIAMS PATENT CRUSHER AND PULVERIZER COMPANY, OF SAME PLACE.

BREAKING-MACHINE.

SPECIFICATION forming part of Letters Patent No. 604,485, dated May 24, 1898.

Application filed July 17, 1897. Serial No. 644,893. (No model.)

*To all whom it may concern:*

Be it known that I, MILTON F. WILLIAMS, a citizen of the United States, residing at the city of St. Louis, State of Missouri, have invented a certain new and useful Improvement in Breaking-Machines, of which the following is a full, clear, and exact description, such as will enable others skilled in the art to which it appertains to make and use the same, reference being had to the accompanying drawings, forming part of this specification, in which—

Figure 3:
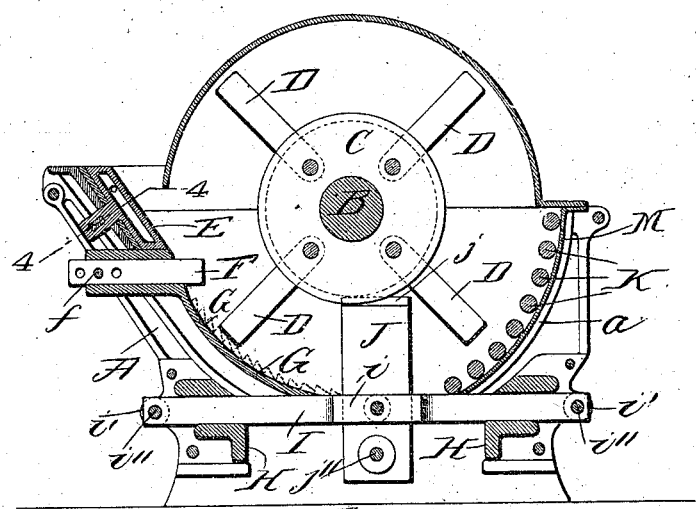
Figure 4:
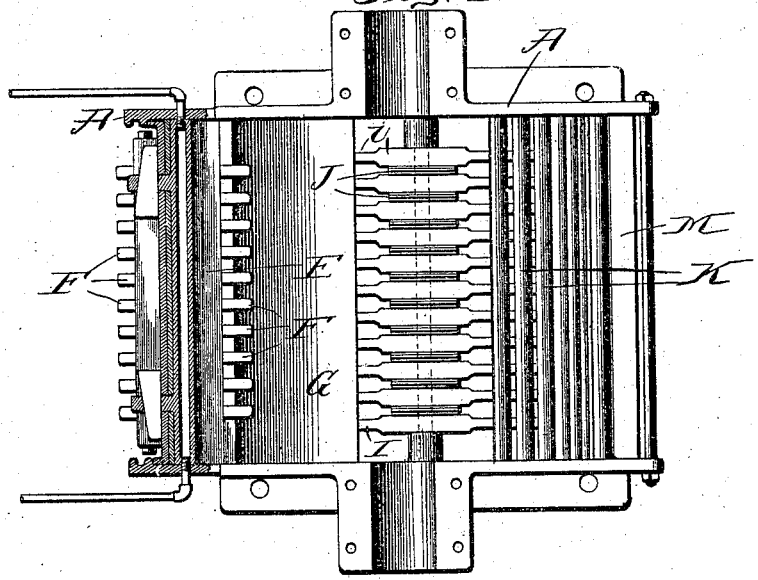

Figure 1 is a rear elevational view of my improved machine. Fig. 2 is a cross-sectional view of the same. Fig. 3 is a similar view showing an adjustable breaker-plate. Fig. 4 is a top plan view, the hammers being omitted and the feed end of the machine being shown in section on line 4 4, Fig. 3. Fig. 5 is a longitudinal sectional view of the entire machine. Fig. 6 is a top plan view of the same, the cover being removed. Fig. 7 is a detail view of one of the vertical arresting-fingers. Fig. 8 is a detail view of a portion of one of the bar-supports. Fig. 9 is a view of a removable cage adapted to be placed in the rear end of the machine. Fig. 10 is a detail view of a portion of a blind for said cage, and Fig. 11 is a detail view of one of the bars.

This invention relates to a new and useful improvement in breaking-machines, but by obvious modifications the machine may be adapted for use in crushing and pulverizing materials.

The object of this invention is to construct a machine of the character described in such manner that materials, such as wood, &c., may be effectually broken with an expenditure of very little power, the machine used in breaking the materials being cheap in construction and simple in operation.

The purpose of breaking or splintering wood is to render the same suitable for fuel with the expenditure of little manual labor. The machine is very useful for this purpose in tobacco-factories and other places where the barrels or hogsheads are destroyed and used for fuel. Heretofore it has been the practice to cut these fuel-staves with a chopping-machine, the staves being manually manipulated. By the use of my machine the staves are fed to the machine, where they are broken or splintered and delivered onto a belt or into a chute, when the pieces are fed to the furnace. The machine is also useful in box-factories, planing-mills, &c., to break up the waste material for fuel purposes.

With this object in view the invention consists in the combination of pivoted revolving hammers, a breaker-plate, fingers projecting from the breaker-plate to primarily disintegrate the material after it leaves the breaker-plate, a series of bars against which the material is crushed by the hammers, and a series of fingers arranged at right angles to the path of the hammers, between which the material is forced by the hammers when it is broken.

Other features of invention reside in the construction, arrangement, and combination of the several parts, all as will hereinafter be described and afterward pointed out in the claims.

In the drawings, A indicates a suitable casing, preferably comprising two side plates which support a shaft B, said shaft having arranged on its ends suitable fly-wheels and driving-pulleys for obvious purposes.

C indicates hammer-supports strung on a shaft between the side plates of the machine, said hammer-supports being preferably grooved, as at c, and carrying between them pivoted hammers D, said hammers being arranged between the supports and mounted on through-bolts *d*, so that each hammer may be independently movable and held in a radial position by centrifugal force due to the rapid rotation of the shaft B and its carried hammer-supports.

E indicates a breaker-plate arranged at the front end of the machine and tangentially disposed to the striking-points of the hammers. The material is fed into the machine on this breaker-plate and is primarily crushed by the hammers striking the material before it leaves the lower end of said breaker-plate.

F indicates fingers arranged at an angle to the path of the striking-points of the hammers. These fingers are so disposed relative to each other and to the hammers that the striking-points of the hammers will pass between said fingers in their revolutions. These fingers are preferably mounted in a block F″, made sufficiently strong to sustain the fingers F rigidly in position. When the ends of the fingers become worn or for any reason it is desired to project the inner ends farther into the machine, such adjustment may be accomplished by withdrawing the through-bolt $f$ and inserting it into a different opening in the rear ends of the fingers F. This through-bolt $f$ holds the fingers in position against longitudinal movement.

G indicates an imperforate concave concentrically arranged relative to the path of the hammers and located beneath the fingers F, said concave being formed by part of the supporting-block F″ or having its upper end abutting thereagainst if the concave is made as a separate piece. If desired, the working face of this concave may be transversely serrated, as shown by dotted lines in Fig. 5, to hold the material being operated to the action of the hammers.

H indicates a bar-support secured to the side framing of the machine, there being preferably two of these bar-supports in the machine, one at the front end and the other at the rear end. These bar-supports, as shown more clearly in Fig. 8, comprise two end pieces or heads and two cross-pieces connecting said heads, said cross-pieces extending transversely the machine and being arranged above and below the bars when the bars are in position.

I indicates bars mounted in the bar-supports H. These bars are so constructed that their ends are reduced in thickness, as shown in Fig. 11, while their middle portions, as at $i$, are increased in thickness at the point where the hammers most nearly approach said bars. The ends of these bars are spaced by suitable washers $i'$ between the heads of the bar-supports H, said washers and the ends of the bars being strung on through-bolts $i''$, which pass through ears $h$ of the heads of the bar-supports H. These through-bolts assist in supporting the bars H, but are not depended upon entirely for this purpose, as the lower of the transverse connecting-pieces of the bar effectively supports the ends of the bars.

J indicates vertically-disposed fingers arranged between the bars L and engaging the hammer-supports C. These fingers are also arranged so that the hammers pass between them, breaking any material which may have lodged against said fingers. These fingers have tongues $j$ on their upper ends, which fit into the peripheral grooves $c$ on the hammer-supports, so that the upper ends of said fingers are separated and prevented from moving laterally or becoming displaced by reason of the great strain placed thereon when the hammers are breaking material lodged against said fingers. The lower ends of said fingers are formed with openings or perforations through which pass through-bolts $j'$ and $i''$, the former also passing through the thickened portion of the bars I and the latter passing through the fingers, and suitable spacing-washers placed between the side framing.

The rear of the machine above the bars I is composed of transversely-disposed bars K, concentrically arranged relative to the path of the hammers. These bars K start from a point immediately above the bars I and terminate short of the cover L of the machine, which cover L may be hinged or bolted in position, as may be desired, and whose function is well understood. In Fig. 5 I have shown these bars K as being mounted directly in the side framing of the machine; but it is obvious that they may be arranged in cage form, as shown in Fig. 9, which will enable their insertion and removal at will, whereby bars placed at different distances apart may be used as desired. I prefer to form a curved rib $a$ on the inside framing of the machine to accommodate this removable cage when same is used. It may also be desired to prevent the broken particles of some materials from passing out the rear end of the machine, and in order to close the rear end I may introduce a slide M, (shown in Fig. 10,) which slide will rest on the rib $a$ and prevent any material escaping from the bars K from passing out.

From the above description the operation of the machine is obvious. The material being introduced on the breaker-plate will be primarily crushed by the hammers on said breaker-plate and when passing over the fingers F will be disintegrated and shredded or splintered, dependent upon the nature of the material introduced into the machine. After the material leaves the fingers F it is pressed or crushed against the imperforate concave G until delivered onto the bars I. After being delivered on the bars I any material attempting to get through said bars leaving an end projecting into the machine such piece of material will be moved to the rear by the action of the hammers until it is arrested by the reduction of space between the bars, due to the increased thickness of the same, when the hammers will operate upon said projecting piece of material and break the same.

The hammers operate in a vertical plane above the bars I, and for that reason the material operated upon by the hammers when in the machine is supported by the bars and more thoroughly disintegrated, shredded, or broken than it would be if the hammers operated above the space between the bars. Any material not reduced to a sufficient degree of fineness to pass between the bars I after passing through the above operation is liable to be arrested by the fingers J and held to the action of the hammers. After being broken across the fingers J if the material is still not of sufficient fineness to pass between the bars I or the bars K if the slide M is not present will be further acted upon by the hammers on the bars K; but any material remaining in the machine after passing beyond the bars K it is obvious that it will be carried around by the hammers and subjected to the same operations until it is reduced in size sufficient to permit its passage between the bars I or the bars K.

In Figs. 3 and 4 I have shown a modified form of breaker-plate which may advantageously be used in some cases if the material to be operated upon is moist. This breaker-plate is hollow and forms a steam-chest into which suitable pipes may be led to introduce steam, the water of condensation being carried off by suitable pipes. I prefer, also, to make this form of breaker-plate adjustable toward or from the path of the striking-points of the hammers, and to accomplish this I provide two or more lugs which pass through the supporting-block and introduce wedges in front of said supporting-block to hold the breaker-plate firmly in position on the supporting-block. The adjustment of the breaker-plate is accomplished by the introduction and removal of liners, which may be inserted or removed from between the breaker-plate and the supporting-block.

I am aware that many minor changes in the construction, arrangement, and combination of the several parts of my machine can be made and substituted for those herein shown and described without in the least departing from the nature and principle of my invention.

Having thus described my invention, what I claim, and desire to secure by Letters Patent, is—

1. The combination with pivoted, revolving hammers, of an adjustable breaker-plate, and fingers, arranged below said breaker-plate, and projecting between the paths of the hammers; substantially as described.

2. The combination with pivoted, revolving hammers, of an adjustable breaker-plate, and adjustable fingers projecting below said breaker-plate between the paths of the hammers; substantially as described.

3. In a crusher, the combination with pivoted revolving hammers, of a breaker-plate, a supporting-block therefor, a lug formed on said breaker-plate and extending through a suitable opening in the supporting-block, said lug being formed with an opening or eye in its outer end, a wedge which passes through said lug opening or eye and coöperates with the supporting-block, and liners which are adapted to be inserted between the breaker-plate and its supporting-block, substantially as described.

4. The combination with pivoted revolving hammers, of a breaker-plate upon which the hammers primarily break or crush the material, fingers below said breaker-plate which project into the spaces between the paths of the hammers, said fingers, in conjunction with the hammers, acting upon the material after it leaves the breaker-plate, a concave for receiving the material as it leaves the fingers, and bars for receiving the material as it leaves the concave, said bars permitting small particles of material to pass between them; substantially as described.

5. The combination with pivoted, revolving hammers and their supports, of longitudinally-disposed bars formed with thickened portions at the points where the hammers most nearly approach said bars, bar-supports for supporting the ends of said bars, and fingers clamped between the thickened portion of said bars, said fingers engaging the hammer-supports; substantially as described.

6. The combination with a suitable casing, of a hammer-shaft mounted therein, pivoted hammers carried by said shaft, bar-supports comprising heads which are connected by parallel cross-pieces, bars mounted in said bar-supports between the parallel cross-pieces, spacers between said bars, and through-bolts for clamping said parts in position, substantially as described.

7. The combination with pivoted, revolving hammers, and bars or fingers projecting between the path of the hammers and engaging the peripheries of the hammer-supports; substantially as described.

8. The combination with pivoted, revolving hammers, of revolving supports therefor, said supports being formed with peripheral grooves, and fingers which extend between said hammers, said fingers being formed with tongues fitting into the grooves on the hammer-supports; substantially as described.

9. The combination with pivoted, revolving hammers, of their supports, bars I coöperating with said hammers, and fingers J secured between the bars I, engaging said hammer-supports and coöperating with said hammers; substantially as described.

10. The combination with pivoted revolving hammers, of longitudinally-disposed bars, a concentrically-arranged series of transversely-disposed bars located at the rear end of the machine and above the bars first mentioned, all of said bars coöperating with the hammers, the spaces between said bars affording an escape for the material when it is reduced to the proper size, and a curved blind which is fitted in concentrically-arranged grooves behind the transversely-disposed bars for preventing the escape of material between said bars, substantially as described.

11. The combination with pivoted revolving hammers, of a breaker-plate tangentially arranged relative to the path of said hammers, and with the lower end of which breaker-plate said hammers coöperate, of a concave arranged below said breaker-plate and forming a continuation thereof, transversely-disposed corrugations or serrations on the working face of said concave, adjustable fingers arranged between the breaker-plate and concave, said fingers projecting inwardly between the paths of the hammers and bars forming a grinding-surface beyond said concave, substantially as described.

In testimony whereof I hereunto affix my signature, in the presence of two witnesses, this 12th day of July, 1897.

MILTON F. WILLIAMS.

Witnesses:
F. R. CORNWALL,
HUGH K. WAGNER.